(12) United States Patent
Yuan (10) Patent No.: US 10,578,794 B2
(45) Date of Patent: Mar. 3, 2020

(54) BACKLIGHT MODULE AND DISPLAY DEVICE

(71) Applicant: Coretronic Corporation, Hsin-Chu (TW)

(72) Inventor: Min-Hao Yuan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/458,195

(22) Filed: Jul. 1, 2019

(65) Prior Publication Data

US 2020/0012040 A1 Jan. 9, 2020

(30) Foreign Application Priority Data

Jul. 9, 2018 (CN) .......................... 2018 1 0743019

(51) Int. Cl.
*F21V 8/00* (2006.01)
(52) U.S. Cl.
CPC ......... *G02B 6/0088* (2013.01); *G02B 6/0068* (2013.01); *G02B 6/0091* (2013.01)
(58) Field of Classification Search
CPC ... G02B 6/0088; G02B 6/0091; G02B 6/0068
See application file for complete search history.

(56) References Cited

U.S. PATENT DOCUMENTS

| 7,944,627 B2 | 5/2011 | Sakagami |
| 2009/0237957 A1 | 9/2009 | Tsubaki |
| 2010/0128465 A1 | 5/2010 | Byoun et al. |

FOREIGN PATENT DOCUMENTS

| TW | M268609 | 6/2005 |
| TW | M269470 | 7/2005 |
| TW | M270369 | 7/2005 |
| TW | M348242 | 1/2009 |
| TW | I315015 | 9/2009 |
| TW | 200942927 | 10/2009 |
| TW | 201042199 | 12/2010 |
| TW | M408063 | 7/2011 |
| TW | M408708 | 8/2011 |

*Primary Examiner* — Joseph L Williams
(74) *Attorney, Agent, or Firm* — JCRIPRNET (57) ABSTRACT

A backlight module and a display device are provided. The backlight module includes a back plate, a light guide plate, a first and a second light sources, and a cushion member. The back plate includes a top surface having an opening, a bottom surface, a first and a second sidewalls, to define an accommodating space. The light guide plate is disposed in the accommodating space. The light guide plate includes a first and a second light-incident surfaces, and it is connected to a light-emitting surface. The first and second light sources are disposed beside the first and second light-incident surfaces respectively, and the first light source is relatively close to the first sidewall of the back plate, and an adjustment space is provided between the second light source and the second sidewall of the back plate. A cushion member is located in the adjustment space.

12 Claims, 4 Drawing Sheets

BACKLIGHT MODULE AND DISPLAY DEVICE

CROSS-REFERENCE TO RELATED APPLICATION

This application claims the priority benefit of China application serial no. 201810743019.3, filed on Jul. 9, 2018. The entirety of the above-mentioned patent application is hereby incorporated by reference herein and made a part of this specification.

BACKGROUND OF THE INVENTION

Field of the Invention

The disclosure relates to a light source module and a display device, and in particular, to a backlight module and a display device using the backlight module.

Description of Related Art

In the current design requirement of a backlight module to accommodate in the narrow frame, the light source is generally disposed on one side of the light guide plate (i.e., adopting a single-side light incident-type design), and the light source is located at the bottom of the backlight module (i.e., on the bottom side of the display device). However, the luminance of the backlight module depends on the number of light-emitting diodes, the luminance cannot be effectively enhanced. To address the issue of luminance above, the double-side light incident-type design is created. When the light source is disposed on the light-incident surfaces of the left and right sides of the light guide plate, a Hotspot phenomenon may occur because a ratio obtained by dividing a distance from the light source to the active region by the pitch of the light source is insufficient. As a result, the width of the back plate has to be increased at the top of the backlight module (i.e., on the top side of the display device) to fully shield the light emission position of the light source. Accordingly, the double-side light incident-type backlight module cannot accommodate the narrow frame design requirement on the top side.

The "Description of Related Art" section is only intended for enhancing understanding of the invention and therefore the content disclosed in the "Description of Related Art" section may contain information that does not form the related art already known to people skilled in the art. The disclosure in the "Description of Related Art" section does not mean that the content or the issues addressed by one or more embodiments of the invention are already previously known or recognized by people skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a backlight module that enhance the design requirement for a narrow frame.

The invention further provides a display device including the backlight module below to accommodate in narrow frame design and provide excellent display quality.

Other purposes and advantages of the invention may be further understood according to the technical features disclosed herein.

To achieve one, part, or all of the foregoing purposes or other purposes, an embodiment of the invention provides backlight module including a back plate, a light guide plate, a first light source, a second light source, and a cushion member. The back plate includes a top surface and a bottom surface opposite to each other and a first sidewall and a second sidewall opposite to each other. The first sidewall and the second sidewall are both connected to the top surface and the bottom surface. The top surface has an opening, and the top surface, the bottom surface, the first sidewall, and the second sidewall define an accommodating space. The light guide plate is disposed on the bottom surface of the back plate and is located in the accommodating space. The light guide plate includes a first light-incident surface and a second light-incident surface opposite to each other, and a light-emitting surface connected to the first light-incident surface and the second light-incident surface. An adjustment space is provided between the second light-incident surface and the second sidewall of the back plate. The first light source is disposed beside the first light-incident surface of the light guide plate and is relatively close to the first sidewall of the back plate. The opening of the top surface exposes part of the first light source. The second light source is disposed beside the second light-incident surface of the light guide plate. The opening of the top surface fully exposes the second light source, and the second light source is located in the adjustment space. The cushion member is disposed on the bottom surface of the back plate and is located in the adjustment space to support a distance from the second light-incident surface of the light guide plate to the second sidewall of the back plate.

Another embodiment of the invention provides a display device including a backlight module and a display module. The backlight module includes a back plate, a light guide plate, a first light source, a second light source, and a cushion member. The back plate includes a top surface and a bottom surface opposite to each other and a first sidewall and a second sidewall opposite to each other. The first sidewall and the second sidewall are both connected to the top surface and the bottom surface. The top surface has an opening, and the top surface, the bottom surface, the first sidewall, and the second sidewall define an accommodating space. The light guide plate is disposed on the bottom surface of the back plate and is located in the accommodating space. The light guide plate includes a first light-incident surface and a second light-incident surface opposite to each other, and a light-emitting surface connected to the first light-incident surface and the second light-incident surface. An adjustment space is provided between the second light-incident surface and the second sidewall of the back plate. The first light source is disposed beside the first light-incident surface of the light guide plate and is relatively close to the first sidewall of the back plate. The opening of the top surface exposes part of the first light source. The second light source is disposed beside the second light-incident surface of the light guide plate. The opening of the top surface fully exposes the second light source, and the second light source is located in the adjustment space. The cushion member is disposed on the bottom surface of the back plate and is located in the adjustment space to support a distance from the second light-incident surface of the light guide plate to the second sidewall of the back plate. The display module is disposed on the backlight module.

Accordingly, the embodiments of the invention at least exhibit one of the advantages or effects below. In the design of the backlight module of an embodiment of the invention, the first light source is disposed beside the first light-incident surface of the light guide plate and is relatively close to the first sidewall of the back plate. The opening of the top surface of the back plate exposes part of the first light source. In other words, an expansion space of the light guide plate is not reserved between the first light source and the first sidewall of the back plate, and the effect of the narrow frame can be achieved. Moreover, the first light source and the second light source are respectively disposed beside the first light-incident surface and the second light-incident surface of the light guide plate, which means that the backlight module is a double-side light incident-type backlight module and has more desirable luminance performance. In addition, an adjustment space is provided between the second light-incident surface of the light guide plate and the second sidewall of the back plate. The cushion member is located in the adjustment space to support the distance from the second light-incident surface of the light guide plate to the second sidewall of the back plate. Through the design of the cushion member, positioning, support, and cushioning effects may be provided for the light guide plate.

To provide a further understanding of the aforementioned and other features and advantages of the invention, exemplary embodiments, together with the reference drawings, are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to allow further understanding of the invention, and the drawings are incorporated into the specification and form a part of the specification. The drawings illustrate the embodiments of the invention and the drawings and the description together are used to interpret the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
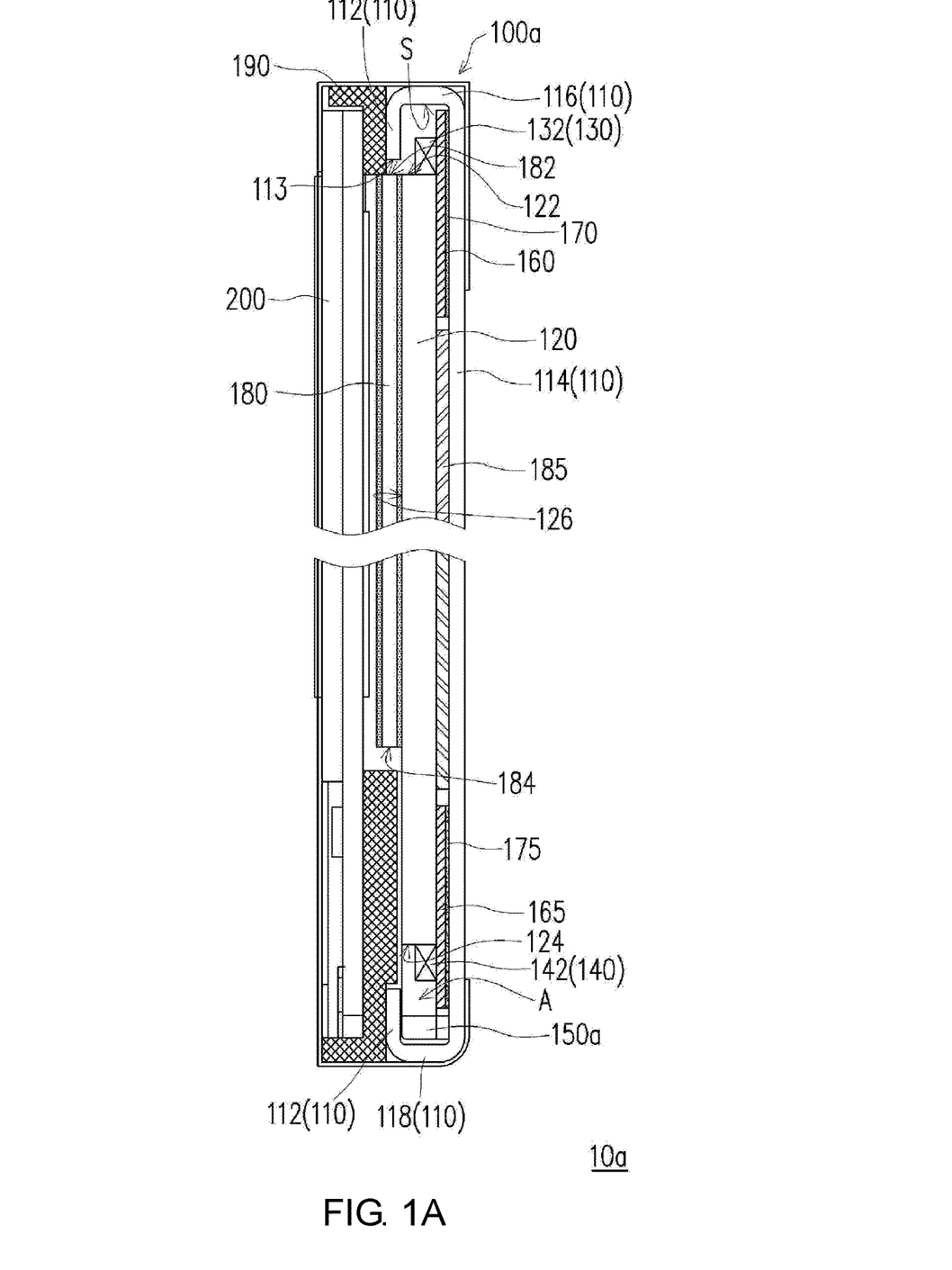
FIG. 1A is a cross-sectional view illustrating a display device according to an embodiment of the invention.
Figure 1B:
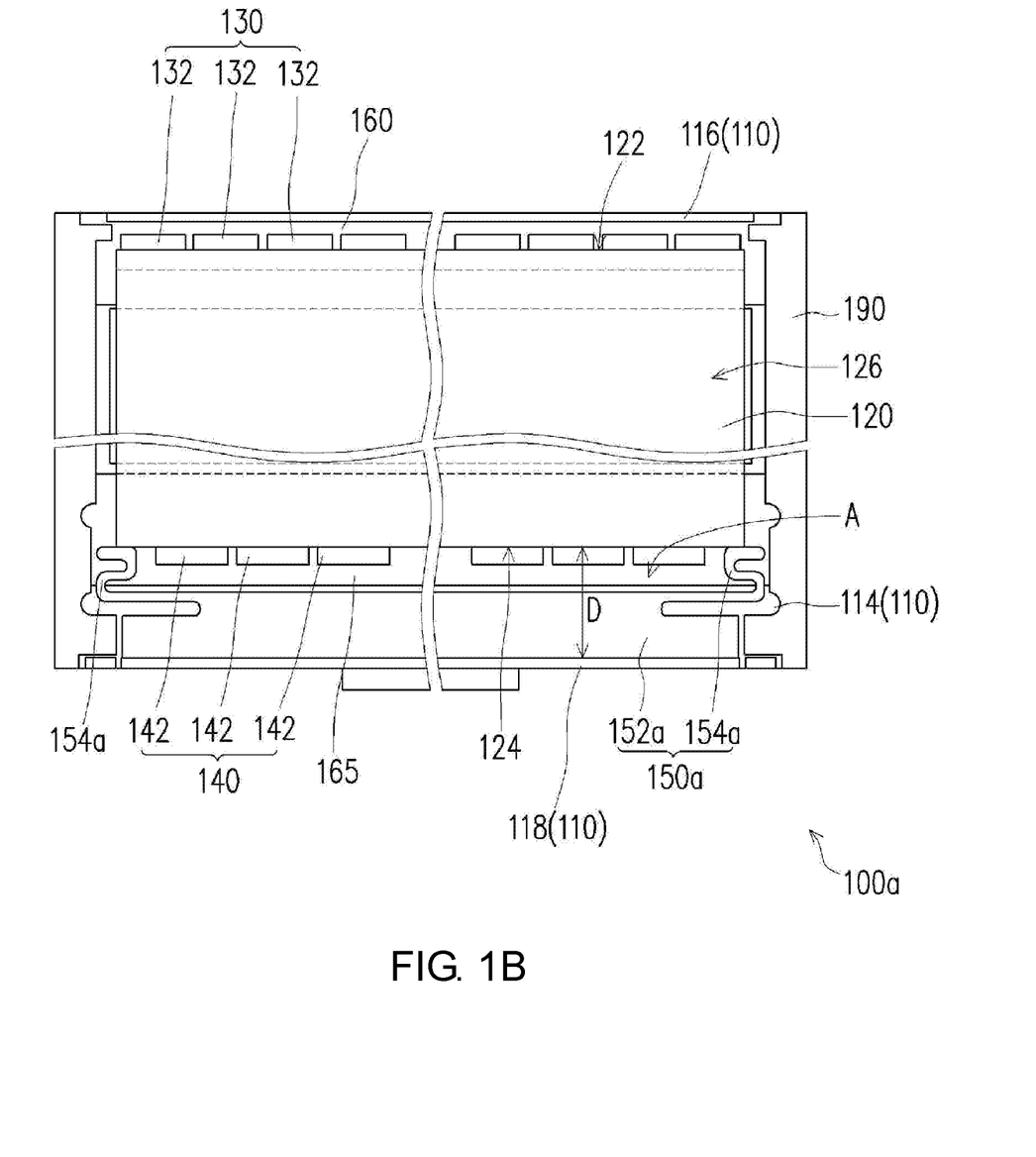
FIG. 1B is a top view illustrating a backlight module of the display device of FIG. 1A.

FIG. 1A is a cross-sectional view illustrating a display device according to an embodiment of the invention. FIG. 1B is a top view illustrating a backlight module of the display device of FIG. 1A. For ease of illustration, part of the components are omitted in FIG. 1B. Referring to both FIG. 1A and FIG. 1B, in the present embodiment, a display device 10a includes backlight module 100a and a display module 200. The display module 200 is disposed on the backlight module 100a. The backlight module 100a includes a back plate 110, a light guide plate 120, a first light source 130, a second light source 140, and a cushion member 150a. The back plate 110 includes a top surface 112 and a bottom surface 114 opposite to each other and a first sidewall 116 and a second sidewall 118 opposite to each other. The first sidewall 116 and the second sidewall 118 are both connected to the top surface 112 and the bottom surface 114. The top surface 112 has an opening 113, and the top surface 112, the bottom surface 114, the first sidewall 116, and the second sidewall 118 define an accommodating space S. The light guide plate 120 is disposed on the bottom surface 114 of the back plate 110 and is located in the accommodating space S. The light guide plate 120 includes a first light-incident surface 122 and a second light-incident surface 124 opposite to each other, and a light-emitting surface 126 connected to the first light-incident surface 122 and the second light-incident surface 124. An adjustment space A is provided between the second light-incident surface 124 and the second sidewall 118 of the back plate 110. The first light source 130 is disposed beside the first light-incident surface 122 of the light guide plate 120 and is relatively close to the first sidewall 116 of the back plate 110. The opening 113 of the top surface 112 of the back plate 110 exposes part of the first light source 130. The second light source 140 is disposed beside the second light-incident surface 124 of the light guide plate 120. The opening 113 of the top surface 112 of the back plate 110 fully exposes the second light source 140, and the second light source 140 is located in the adjustment space A. The cushion member 150a is disposed on the bottom surface 114 of the back plate 110 and is located in the adjustment space A to support a distance D from the second light-incident surface 124 of the light guide plate 120 to the second sidewall 118 of the back plate 110.

More specifically, in the present embodiment, the first light source 130 and the second light source 140 are respectively disposed beside the first light-incident surface 122 and the second light-incident surface 124 of the light guide plate 120, which means that the backlight module 100a of the present embodiment is a double-side light incident-type backlight module and has more desirable luminance performance. Moreover, the backlight module 100a of the present embodiment further includes a first circuit board 160 and a second circuit board 165. The first circuit board 160 and the second circuit board 165 are both disposed on the bottom surface 114 of the back plate 110. The first light source 130 includes a plurality of first light-emitting diodes 132. The first light-emitting diodes 132 are dispersedly disposed on the first circuit board 160 and are electrically connected to the first circuit board 160. The second light source 140 includes a plurality of second light-emitting diodes 142. The second light-emitting diodes 142 are dispersedly disposed on the second circuit board 165 and are electrically connected to the second circuit board 165. Here, as shown in FIG. 1B, the first light-emitting diodes 132 and the second light-emitting diodes 142 are both disposed along the long side of the back plate 110 (i.e., in the extension direction of the first sidewall 116 and the second sidewall 118). Therefore, the number (the number of chips) of the first light-emitting diodes 132 and the second light-emitting diodes 142 that can be greater than the illustration but are not limited thereto. On the other hand, the pitch of the light emission points between the first light-emitting diodes 132 and the pitch of the light emission points between the second light-emitting diodes 142 can be minimized, which is favorable for the narrow frame design. Here, the first light-emitting diodes 132 and the second light-emitting diodes 142 are, for example, dual-chip light-emitting diodes but are not limited thereto.

In addition, the backlight module 100a of the present embodiment further includes a first adhesive layer 170 and a second adhesive layer 175. The first adhesive layer 170 is disposed between the first circuit board 160 and the bottom surface 114 of the back plate 110 to connect the first circuit board 160 and the back plate 110. The second adhesive layer 175 is disposed between the second circuit board 165 and the bottom surface 114 of the back plate 110 to connect the second circuit board 165 and the back plate 110. Specifically, an adhesive force of the first adhesive layer 170 is greater than an adhesive force of the second adhesive layer 175. Therefore, an adhesion force between the first circuit board 160 and the bottom surface 114 of the back plate 110 is greater than an adhesion force between the second circuit board 165 and the bottom surface 114 of the back plate 110. In other words, the first circuit board 160 may be regarded as being fixed on the bottom surface 114 of the back plate 110, and the second circuit board 165 may be regarded as being slightly movable on the bottom surface 114 of the back plate 110. In the present embodiment, the first light-emitting diodes 132 are disposed and fixed on the first circuit board 160, and the first light-emitting diodes 132 are located beside the first light-incident surface 122 of the light guide plate 120 and are closely adjacent to the first sidewall 116 of the back plate 110. Therefore, an expansion space of the light guide plate 120 is not reserved between the first light-emitting diodes 132 and the first sidewall 116 of the back plate 110, and the effect of the narrow frame can be achieved.

Referring to FIG. 1B again, the cushion member 150a of the present embodiment includes a support base 152a and a plurality of elastic structures 154a. The support base 152a is disposed on the bottom surface 114 of the back plate 110 and abuts the second sidewall 118. The elastic structures 154a are connected to the support base 152a and abut the second light-incident surface 124 of the light guide plate 120. For example, the support base 152a and the elastic structures 154a are integrally formed. Here, for example each of the elastic structures 154a is in a S-shape in the top view. Moreover, in other unillustrated embodiments, the elastic structure may also be in a L-shape, a J-shape, or a U-shape in the top view, and the invention is not limited thereto. In the present embodiment, the adjustment space A is provided between the second light-incident surface 124 of the light guide plate 120 and the second sidewall 118 of the back plate 110, and the cushion member 150a is located in the adjustment space A. Therefore, when the light guide plate 120 expands due to heating, the light guide plate 120 brings the second circuit board 165 and the second light-emitting diodes 142 thereon to together move towards the second sidewall 118 of the back plate 110. At this time, the cushion member 150a located in the adjustment space A may provide positioning, support, and cushioning effects for the light guide plate 120. In other words, the light guide plate 120 of the present embodiment undergoes expansion and contraction in the adjustment space A.

In addition, referring to FIG. 1A again, the backlight module 100a of the present embodiment further includes an optical film member 180. The optical film member 180 is disposed on the light-emitting surface 126 of the light guide plate 120 and includes a first side edge 182 and a second side edge 184 opposite to each other. The first side edge 182 of the optical film member 180 is flush with the first light-incident surface 122 of the light guide plate 120, and the second side edge 184 of the optical film member 180 is not flush with the second light-incident surface 124 of the light guide plate 120. In other words, the optical film member 180 exposes part of the light-emitting surface 126 of the light guide plate 120. Moreover, the backlight module 100a of the present embodiment further includes a reflector 185. The reflector 185 is disposed between the light guide plate 120 and the bottom surface 114 of the back plate 110 and is configured to reflect the light emitted by the first light-emitting diodes 132 and the second light-emitting diodes 142 to enhance the light emission efficiency of the backlight module 100a. In addition, the backlight module 100a of the present embodiment further includes a plastic frame 190. The plastic frame 190 is assembled with the back plate 110 and shields the second light source 140 exposed by the opening 113 of the top surface 112.

In brief, in the design of the backlight module 100a of the present embodiment, the first light source 130 is disposed beside the first light-incident surface 122 of the light guide plate 120 and is relatively close to the first sidewall 116 of the back plate 110, such that an expansion space of the light guide plate 120 is not reserved between the first light source 130 and the first sidewall 116 of the back plate 110, and the effect of the narrow frame can be achieved. Moreover, the first light source 130 and the second light source 140 are respectively disposed beside the first light-incident surface 122 and the second light-incident surface 124 of the light guide plate 120, which can enhance the luminance performance of the backlight module 100a. In addition, in the backlight module 100a of the present embodiment, the cushion member 150a disposed in the adjustment space A can provide positioning, support, and cushioning effects for the light guide plate 120. Furthermore, in addition to having the narrow frame design, the display device 10a using the backlight module 100a of the present embodiment also exhibits more desirable display quality.

It is noted that the structural form of the cushion member 150a is not limited herein. Cushion members 150b and 150c of different types will be described in separate embodiments below. It is noted that the reference numerals and part of the description of the embodiment above apply to the embodiments below. The same reference numerals represent the same or similar components, and descriptions of the same technical contents are omitted. Reference may be made to the embodiment above for the omitted descriptions, which shall not be repeated in the embodiments below.

Figure 2A:
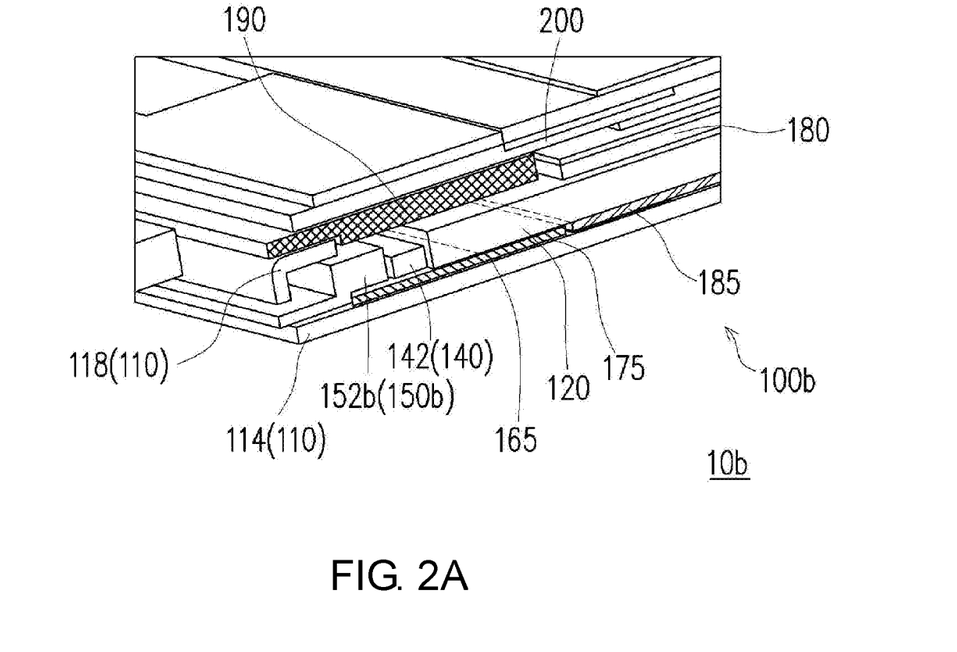
FIG. 2A is a partial cross-sectional perspective view illustrating a display device according to another embodiment of the invention.
Figure 2B:
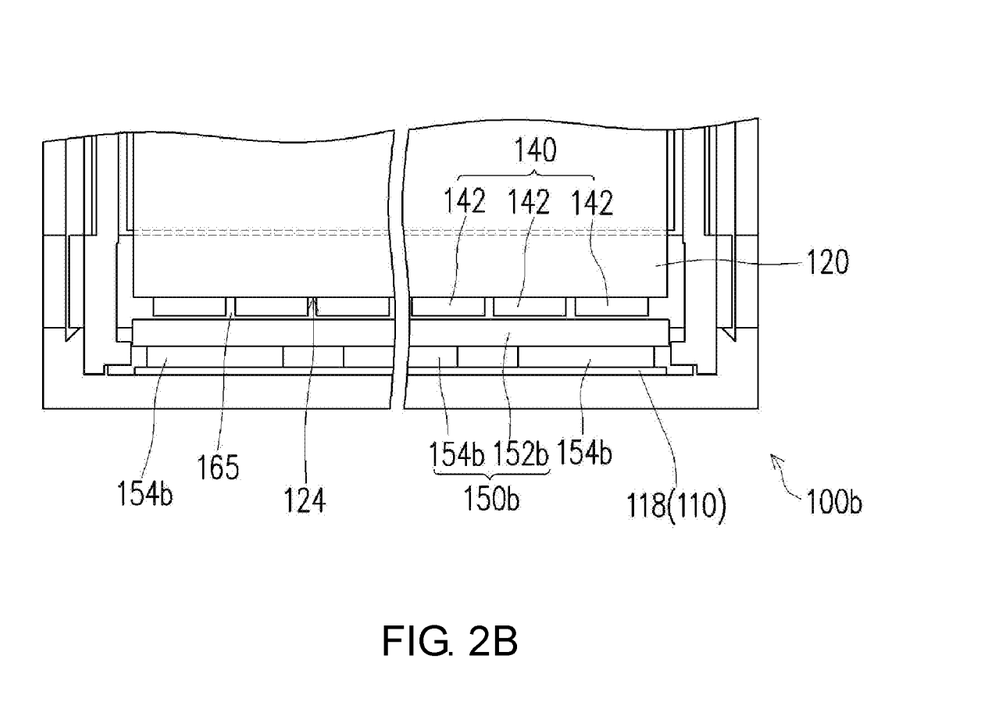
FIG. 2B is a partial top view illustrating a backlight module of the display device of FIG. 2A.

FIG. 2A is a partial cross-sectional perspective view illustrating a display device according to another embodiment of the invention. FIG. 2B is a partial top view illustrating a backlight module of the display device of FIG. 2A. First, referring to FIG. 1A, FIG. 1B, FIG. 2A, and FIG. 2B at the same time, a display device 10b of the present embodiment is similar to the display device 10a of FIG. 1A. The difference between the two lies in that a cushion member 150b of a backlight module 100b of the present embodiment includes a support base 152b and a plurality of elastic structures 154b. The elastic structures 154b are disposed on the bottom surface 114 of the back plate 110 and abut the second sidewall 118. The support base 152b is disposed on the bottom surface 114 of the back plate 110 and is located between the second light source 140 and the elastic structures 154b. Here, the elastic structures 154b are, for example, a foam but are not limited thereto.

Figure 3:
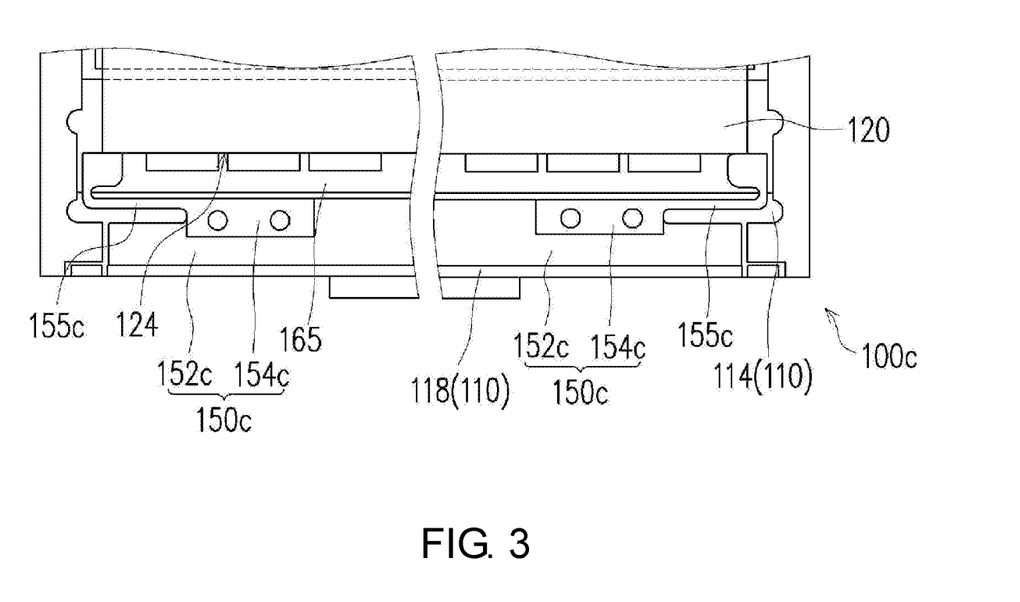
FIG. 3 is a partial top view illustrating a backlight module according to another embodiment of the invention.

FIG. 3 is a partial top view illustrating a backlight module according to another embodiment of the invention. Referring to both FIG. 1B and FIG. 3, a backlight module 100c of the present embodiment is similar to the backlight module 100a of FIG. 1B. The difference between the two lies in that a cushion member 150c of the present embodiment includes a support base 152c and an elastic structure 154c. The support base 152c is disposed on the bottom surface 114 of the back plate 110 and abuts the second sidewall 118. The elastic structure 154c is detachably assembled on the support base 152c, and the elastic structure 154c includes a plurality of elastic clips 155c. The elastic clips 155c abut the second light-incident surface 124 of the light guide plate 120. Here, for example each of the elastic clips 155c is in a J-shape in the top view. Moreover, in other unillustrated embodiments, the elastic clip may also be in an S-shape, an L-shape, or a U-shape in the top view, and the invention is not limited thereto.

Figure 4:
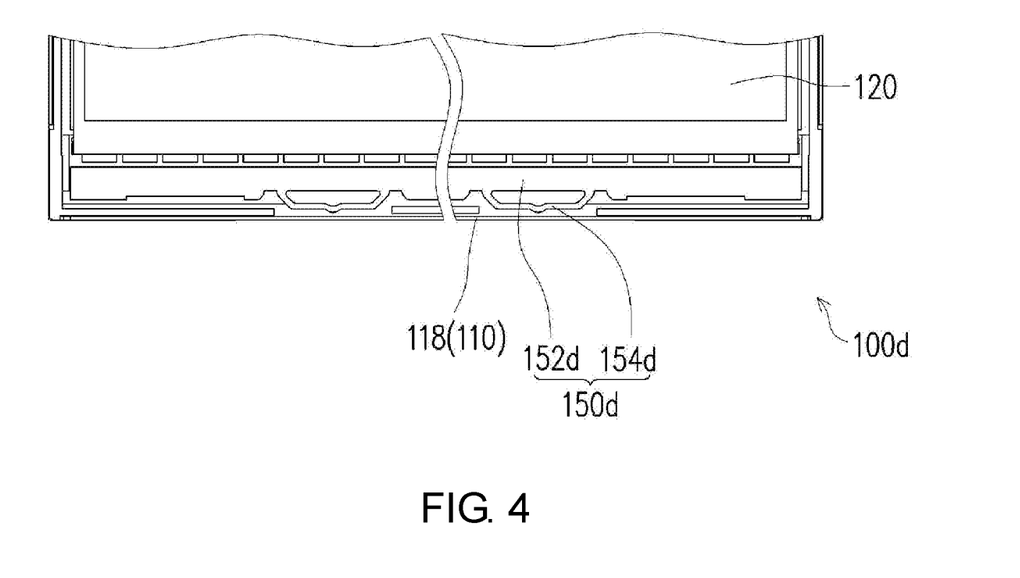
FIG. 4 is a partial top view illustrating a backlight module according to another embodiment of the invention.

FIG. 4 is a partial top view illustrating a backlight module according to another embodiment of the invention. Referring to both FIG. 3 and FIG. 4, a backlight module 100d of the present embodiment is similar to the backlight module 100c of FIG. 3. The difference between the two lies in that a cushion member 150d of the present embodiment includes a support base 152d and an elastic structure 154d. The elastic structure 154d of the present embodiment may be disposed below the support base 152d and may be spaced apart from the second sidewall 118 of the back plate 110 by a gap. In other words, the elastic structure 154d is not in contact with the second sidewall 118 of the back plate 110. For example, an assembly tolerance may be reserved in the design of the elastic structure 154d. After the light guide plate 120 expands due to heating, the elastic structure 154d touches the second sidewall 118 of the back plate 110 first, such that the expansion of the light guide plate 120 is confined, and the light guide plate 120 is prevented from moving downwards, which results in a gap between the light guide plate 120 and the light source and causes optical luminance deterioration.

In summary of the above, in the design of the backlight module of an embodiment of the invention, the first light source is disposed beside the first light-incident surface of the light guide plate and is relatively close to the first sidewall of the back plate. The opening of the top surface of the back plate exposes part of the first light source. In other words, an expansion space of the light guide plate is not reserved between the first light source and the first sidewall of the back plate, and the effect of the narrow frame can be achieved. Moreover, the first light source and the second light source are respectively disposed beside the first light-incident surface and the second light-incident surface of the light guide plate, which means that the backlight module is a double-side light incident-type backlight module and has more desirable luminance performance. In addition, the adjustment space is provided between the second light-incident surface of the light guide plate and the second sidewall of the back plate. The cushion member is located in the adjustment space to support the distance from the second light-incident surface of the light guide plate to the second sidewall of the back plate. Through the design of the cushion member, positioning, support, and cushioning effects may be provided for the light guide plate.

The description above only includes some embodiments of the invention and thus does not limit the scope of implementation of the invention. Namely, all simple equivalent variations and modifications made according to the claims and description of the invention still fall in the scope covered by the invention. Moreover, any embodiment or claim of the invention is not required to achieve all purposes, advantages, or features disclosed in the invention. In addition, the abstract and title merely serve to assist in search of patent documents and are not meant to limit the claims of the invention. Furthermore, the terms "first", "second", etc. mentioned in the claims are merely used to designate names of elements or distinguish among different embodiments or scopes and are not meant to designate upper or lower limits of numbers of elements.

Lastly, it shall be noted that the foregoing embodiments are meant to illustrate, rather than limit, the technical solutions of the embodiments of the invention. Although the invention has been detailed with reference to the foregoing embodiments, persons ordinarily skilled in the art shall be aware that they may still make modifications to the technical solutions recited in the foregoing embodiments or make equivalent replacements of part or all of the technical features therein, and these modifications or replacements do not cause the nature of the corresponding technical solutions to depart from the scope of the technical solutions of the embodiments of the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
a back plate;
a light guide plate;
a first light source;
a second light source, and a cushion member;
wherein the back plate comprises a top surface and a bottom surface opposite to each other and a first sidewall and a second sidewall opposite to each other, and the first sidewall and the second sidewall are both connected to the top surface and the bottom surface, wherein the top surface has an opening, and the top surface, the bottom surface, the first sidewall, and the second sidewall define an accommodating space;
the light guide plate is disposed on the bottom surface of the back plate and is located in the accommodating space, and the light guide plate comprises a first light-incident surface and a second light-incident surface opposite to each other, and a light-emitting surface connected to the first light-incident surface and the second light-incident surface, wherein an adjustment space is provided between the second light-incident surface and the second sidewall of the back plate;
the first light source is disposed beside the first light-incident surface of the light guide plate and is relatively close to the first sidewall of the back plate, wherein the opening of the top surface exposes part of the first light source;
the second light source is disposed beside the second light-incident surface of the light guide plate, wherein the opening of the top surface fully exposes the second light source, and the second light source is located in the adjustment space; and
the cushion member is disposed on the bottom surface of the back plate and is located in the adjustment space to support a distance from the second light-incident surface of the light guide plate to the second sidewall of the back plate.

2. The backlight module according to claim 1, further comprising:
a first circuit board disposed on the bottom surface of the back plate, wherein the first light source comprises a plurality of first light-emitting diodes, and the first light-emitting diodes are dispersedly disposed on the first circuit board and are electrically connected to the first circuit board; and
a second circuit board disposed on the bottom surface of the back plate, wherein the second light source comprises a plurality of second light-emitting diodes, and the second light-emitting diodes are dispersedly disposed on the second circuit board and are electrically connected to the second circuit board.

3. The backlight module according to claim 2, further comprising:
a first adhesive layer disposed between the first circuit board and the bottom surface of the back plate; and
a second adhesive layer disposed between the second circuit board and the bottom surface of the back plate, wherein an adhesiveness of the first adhesive layer is greater than an adhesiveness of the second adhesive layer.

4. The backlight module according to claim 1, further comprising:
an optical film member disposed on the light-emitting surface of the light guide plate and comprising a first side edge and a second side edge opposite to each other, wherein the first side edge of the optical film member is flush with the first light-incident surface of the light guide plate, the optical film member exposes part of the light-emitting surface, and the second side edge of the optical film member is not flush with the second light-incident surface of the light guide plate.

5. The backlight module according to claim 4, further comprising:
a plastic frame assembled with the back plate and shielding the second light source exposed by the opening of the top surface.

6. The backlight module according to claim 1, wherein the cushion member comprises:
a support base disposed on the bottom surface of the back plate and abutting the second sidewall; and
a plurality of elastic structures connected to the support base and abutting the second light-incident surface of the light guide plate, wherein the support base and the elastic structures are integrally formed.

7. The backlight module according to claim 6, wherein a shape of each of the elastic structures in a top view comprises a S-shape, a L-shape, a J-shape, or a U-shape.

8. The backlight module according to claim 1, wherein the cushion member comprises:
a support base disposed on the bottom surface of the back plate and abutting the second sidewall; and
an elastic clip detachably assembled on the support base and comprising a plurality of elastic structures, wherein the elastic structures abut the second light-incident surface of the light guide plate.

9. The backlight module according to claim 8, wherein a shape of each of the elastic structures in a top view comprises an S-shape, an L-shape, a J-shape, or a U-shape.

10. The backlight module according to claim 1, wherein the cushion member comprises:
a plurality of elastic structures disposed on the bottom surface of the back plate and abutting the second sidewall; and a support base disposed on the bottom surface of the back plate and located between the second light source and the elastic structures.

11. The backlight module according to claim 1, further comprising:
a reflector disposed between the light guide plate and the bottom surface of the back plate.

12. A display device comprising a backlight module and a display module, wherein
the backlight module comprises a back plate, a light guide plate, a first light source, a second light source, and a cushion member, wherein
the back plate comprises a top surface and a bottom surface opposite to each other and a first sidewall and a second sidewall opposite to each other, and the first sidewall and the second sidewall are both connected to the top surface and the bottom surface, wherein the top surface has an opening, and the top surface, the bottom surface, the first sidewall, and the second sidewall define an accommodating space;
the light guide plate is disposed on the bottom surface of the back plate and is located in the accommodating space, and the light guide plate comprises a first light-incident surface and a second light-incident surface opposite to each other, and a light-emitting surface connected to the first light-incident surface and the second light-incident surface, wherein an adjustment space is provided between the second light-incident surface and the second sidewall of the back plate;
the first light source is disposed beside the first light-incident surface of the light guide plate and is relatively close to the first sidewall of the back plate, wherein the opening of the top surface exposes part of the first light source;
the second light source is disposed beside the second light-incident surface of the light guide plate, wherein the opening of the top surface fully exposes the second light source, and the second light source is located in the adjustment space; and
the cushion member is disposed on the bottom surface of the back plate and is located in the adjustment space to support a distance from the second light-incident surface of the light guide plate to the second sidewall of the back plate; and
the display module is disposed on the backlight module.

* * * * *